US012034194B2

(12) United States Patent
Kang et al.

(10) Patent No.: US 12,034,194 B2
(45) Date of Patent: *Jul. 9, 2024

(54) PHASE SHIFTER INCLUDING A FIXED BOARD UNIT AND AT LEAST ONE MOVING BOARD UNIT THAT IS COMPLETELY SURROUNDED BY A GUIDING BRACKET

(71) Applicant: KMW INC., Hwaseong-si (KR)

(72) Inventors: Seong-man Kang, Seoul (KR); Yong Hee Han, Seoul (KR); Sung-hwan So, Hwaseong-si (KR); Dae-myung Park, Hwaseong-si (KR); Hae Ri Roh, Namyangju-si (KR); Gyo Jin Jo, Yongin-si (KR); Chang Won Seo, Yongin-si (KR)

(73) Assignee: KMW INC., Hwaseong-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,920

(22) Filed: Apr. 5, 2023

(65) Prior Publication Data

US 2023/0246319 A1 Aug. 3, 2023

Related U.S. Application Data

(63) Continuation of application No. 17/145,382, filed on Jan. 10, 2021, now Pat. No. 11,652,263, which is a (Continued)

(30) Foreign Application Priority Data

Jul. 11, 2018 (KR) ........................ 10-2018-0080786

(51) Int. Cl.
*H01P 1/18* (2006.01)
*H01Q 3/32* (2006.01)

(52) U.S. Cl.
CPC ............... *H01P 1/184* (2013.01); *H01Q 3/32* (2013.01)

(58) Field of Classification Search
CPC ................................... H01P 1/184; H01P 9/00
(Continued)

(56) References Cited

U.S. PATENT DOCUMENTS 6,512,426 B1 1/2003 Wixforth
6,864,837 B2 3/2005 Runyon et al.
(Continued)

FOREIGN PATENT DOCUMENTS

CN 102414911 A 4/2012
CN 103560319 A 2/2014
(Continued)

OTHER PUBLICATIONS

International Search Report for PCT/KR2019/008459 mailed Oct. 16, 2019 and its English translation.
(Continued)

*Primary Examiner* — Benny T Lee
(74) *Attorney, Agent, or Firm* — Insight Law Group, PLLC; Seung Lee

(57) ABSTRACT

Disclosed is a phase shifter. According to an embodiment of the present invention, provided is a phase shifter comprising: an elongated fixed board unit including one or more fixed circuit boards each having a circuit pattern formed on one surface thereof, a guiding bracket surrounding the fixed board unit and fixed to the fixed board unit, and one or more moving board units disposed between the guiding bracket and at least one surface of the fixed board unit, guided by the guiding bracket, and including one or more moving circuit boards having conductive strips formed thereon that are coupled to the circuit patterns on the fixed circuit boards.

12 Claims, 8 Drawing Sheets

Related U.S. Application Data continuation of application No. PCT/KR2019/008459, filed on Jul. 10, 2019.

(58) Field of Classification Search
USPC .......................................................... 333/161
See application file for complete search history.

(56) References Cited

U.S. PATENT DOCUMENTS

| | | | | |
|---|---|---|---|---|
| 7,224,246 | B2 | 5/2007 | Thomas | |
| 8,907,744 | B2 | 12/2014 | Moon et al. | |
| 11,652,263 | B2 * | 5/2023 | Kang et al. | H01P 1/184 333/161 |
| 2005/0248494 | A1 | 11/2005 | Davies | |
| 2012/0056692 | A1 | 3/2012 | Moon et al. | |
| 2016/0111785 | A1 | 4/2016 | Park | |
| 2018/0337438 | A1 | 11/2018 | So et al. | |

FOREIGN PATENT DOCUMENTS

| | | | |
|---|---|---|---|
| CN | 105140600 | A | 12/2015 |
| CN | 106463804 | A | 2/2017 |
| CN | 105514538 | B | 5/2018 |
| GB | 2426535 | A | 11/2006 |
| JP | 2012-526447 | A | 10/2012 |
| KR | 10-2010-0122005 | A | 11/2010 |
| KR | 10-1083027 | B1 | 11/2011 |
| KR | 10-1472422 | B1 | 12/2014 |
| KR | 10-2017-0092373 | A | 8/2017 |

OTHER PUBLICATIONS

Non-final Office Action mailed Apr. 28, 2022 for U.S. Appl. No. 17/145,382.

Final Office Action mailed Sep. 15, 2022 for U.S. Appl. No. 17/145,382.

Notice of Allowance mailed Jan. 6, 2023 for U.S. Appl. No. 17/145,382.

Extended European Search Report mailed Sep. 27, 2023 from the European Patent Office for European Application No. 19834450.9.

Japanese Office Action mailed on Dec. 5, 2023 from the Japanese Patent Office for Japanese Application No. 2022-163725 and its English translation.

Chinese Office Action mailed on Jan. 19, 2024 from the Chinese Patent Office for Chinese Application No. 201980046624.8 and its English translation.

* cited by examiner

PHASE SHIFTER INCLUDING A FIXED BOARD UNIT AND AT LEAST ONE MOVING BOARD UNIT THAT IS COMPLETELY SURROUNDED BY A GUIDING BRACKET

CROSS-REFERENCE TO RELATED APPLICATIONS

This application is a continuation of U.S. application Ser. No. 17/145,382, filed on Jan. 10, 2021 (now U.S. Pat. No. 11,652,263, issued on May 16, 2023), which is a continuation of International Application No. PCT/KR2019/008459, filed on Jul. 10, 2019, which claims the benefit of Korean Patent Application NO. 10-2018-0080786, filed on Jul. 11, 2018, in the Korean Intellectual Property Office, the disclosures of which are incorporated herein in their entirety by reference.

BACKGROUND

1) Field

The disclosure relates to a phase shifter.

2) Description of Related Art

The statements in this section merely present background knowledge for the disclosure, and do not necessarily constitute prior art.

Horizontal beam antennas are most efficient in terms of coverage, but may need to be designed to be inclined at an angle due to interference or loss. In this case, mechanically installing antennas inclined downwards involves a huge troublesomeness for several reasons such as the need for an operator to visit on site and shut off a power supply during the operation. In order to avoid such troublesomeness, an electrical beam tilt scheme is used rather than the above mechanical beam tilt schemes.

The electrical beam tilt scheme is multiple phase shifters (MLPS) based scheme. The electrical beam tilt scheme is the way shifts phase difference of signals fed to each of radiating elements of the antenna arranged vertically. Techniques related to the electrical beam tilt scheme have been described U.S. Pat. No. 6,864,837, etc.

On the other hand, in general, a phase shifter must be provided for the electrical beam tilting. The phase shifter is used in various fields, including beam control of phased array antennas, to perform a phase modulation function at an RF analog signal processing stage. A principle of the phase shifter is to appropriately delay an input signal so that the phase difference between the input and output signals is generated, and this may be implemented by changing a physical length of a transmission line, changing a signaling speed in the transmission line, and the like.

The technique related to these phase shifters is exemplified by U. S. Patent Publication NO. 2005/0248494, which discloses a fixed board unit having one input port and five pairs of output ports and a moving circuit board having a conductive strip. However, the above prior art has a structure in which a fixed board unit and a moving circuit board are provided only on one surface of the phase shifter, and the space of the phase shifter is not fully utilized. Further, there are disadvantages that the moving parts have become less durable because of the repeated physical contacts of the protruded portions of the moving parts, and it is difficult to cope with changes of transmission range due to the limitation on the slot length.

On the other hand, antennas used extensively in recent years in base stations and repeaters in mobile communication systems are often multiband frequency antennas for various bandwidth services. Such multiband antennas need to individually adjust phases of several band frequencies. Individual phase adjustment of several band frequencies requires more phase shifters, and there is a problem associated with spatial constraints.

In order to address these issues, a method of assigning more space to the phase shifter from an inner space of the antenna is used, but this causes a problem that an actual space for antenna elements is reduced.

SUMMARY OF THE INVENTION

Accordingly, the disclosure is to provide a phase shifter having a simple configuration and capable of being reduced in size and weight.

The disclosure is also to provide a phase shifter which enhances the space utilization to occupy less space in an antenna.

Moreover, the disclosure is to provide a phase shifter easy to repair and reassemble.

According to an embodiment of the present invention, provided is a phase shifter including: an elongated fixed board unit including one or more fixed circuit boards, each circuit board having a circuit pattern formed on one surface thereof, a guiding bracket surrounding the fixed board unit and fixed to the fixed board unit, and one or more moving board units disposed between the guiding bracket and at least one surface of the fixed board unit, guided by the guiding bracket, and including one or more moving circuit boards having conductive strips formed thereon that are coupled to the circuit patterns on the fixed circuit boards.

DETAILED DESCRIPTION OF THE INVENTION

Figure 1:
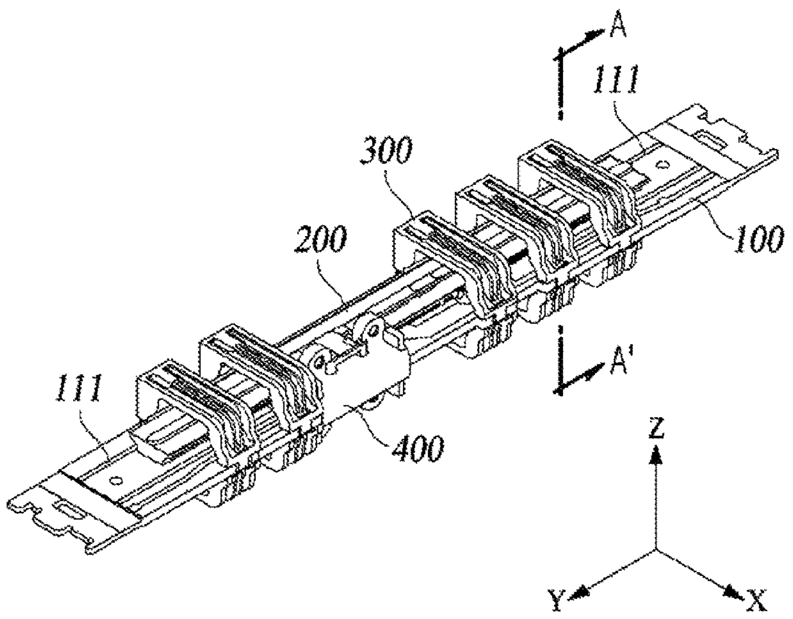
FIG. 1 is a perspective view of a phase shifter in accordance with an embodiment of the disclosure.

In the following, some embodiments of the disclosure will be described in detail with reference to illustrative drawings. It should be noted that, in labeling each element in the drawings with reference numbers, whenever possible, the same elements are intended to have the same reference numbers even though the same elements are indicated in different drawings. In addition, in describing the disclosure, known components or features involved are not described in detail in order not to obscure the subject matter of the disclosure.

The designations such as “a first”, “a second”, “i)”, “ii)”, “a)”, “b)”, and so forth may be used herein to describe the components of the embodiments according to the disclosure. The above designations are just to distinguish one element from the other elements, and do not limit the essence or sequence, order or the like of those components. As used herein, reference to “include,” “includes,” “including,” “comprise,” “comprises,” “comprising,” or any variation thereof, indicates that any part that comprises any element does not exclude any other elements, but may also include other elements, unless expressly stated otherwise.

In the specification, let the x-axis direction in FIG. 1 be set to “crosswise”; let the y-axis direction be set to “lengthwise”; and let the z-axis direction be set to be “elevational”. Meanwhile, let “widthwise” be used in the same meaning as “crosswise” and “longitudinal” be used in the same meaning as “lengthwise” to describe with reference to a fixed board unit 100.

FIG. 1 is a perspective view of a phase shifter in accordance with an embodiment of the disclosure.

Referring to FIG. 1, the phase shifter according to an embodiment of the disclosure includes a fixed board unit 100, a moving board unit 200, and a guiding bracket 300.

The phase shifter may also include a holder 400 for connecting an external device and the phase shifter according to an embodiment of the disclosure.

The fixed board unit 100 includes circuit patterns 111 which are signal transmission paths of antenna signals. The fixed board unit 100 includes one or more ports, through which the fixed board unit 100 may be connected with antenna cables. The circuit patterns 111 formed on the fixed board unit 100 receives the antenna signals from the antenna cables, and provides the transmission path of the antenna signals.

The moving board unit 200 is formed on one surface or the other surface of the fixed board unit 100. The moving board unit 200 is prevented from being dislocated by the guiding bracket 300. Further, the moving board unit 200 is guided by the guiding bracket 300 and may slide in the longitudinal direction of the fixed board portion 100. The moving board unit 200 may be displaced on the fixed board unit 100 by sliding in the longitudinal direction of the fixed board unit 100. This relative displacement of the moving board unit 200 with respect to the fixed board unit 100 may result in a change in shape or length of the transmission path of the antenna signals as described later. In this way, a phase of the antenna signals is shifted depending on the change of the transmission path of the antenna signals.

A system in which the moving board unit 200 is brought into contact with the fixed board unit 100 may be a surface contact system in that one surface of the moving board unit 200 comes into surface-to-surface contact with the circuit patterns 111 formed on the fixed board unit 100. This surface contact system may cause the fixed board unit 100 and the moving board unit 200 to be relatively less damaged as compared to a point contact system such as, for example, a ball-type component brought into contacting with the circuit patterns 111, etc.

On the other hand, the moving board unit 200 may be formed on both surfaces of the fixed board unit 100. This is made possible by the guiding bracket 300 being located on both surfaces of the fixed board unit 100 to prevent dislocation of the moving board unit 200 from outer sides of the moving board unit 200.

The embodiment has a construction in which the moving board unit 200 may be formed on both surfaces of the fixed board unit 100, thereby enabling phase shift of the antenna signals on the both surfaces thereof. As such, since the phase shifter according to an embodiment of the disclosure enables phase shift on both surfaces of the fixed board unit 100, the proposed phase shifter may achieve a smaller volume and enhance the utilization of a space as compared with a configuration capable of phase shifting only on one surface thereof.

One or more guiding brackets 300 are disposed around the fixed board unit 100, and are fixed to the fixed board unit 100.

Moreover, the guiding bracket 300 guides the moving board unit 200, and the moving plate portion 200 may slide along the longitudinal direction of the fixed board portion 100 in a region defined by the guiding bracket 300. In particular, the guiding bracket 300 has a rail structure as will be described later, and may smoothly guide the moving board unit 200 to reduce damage to the surfaces of the fixed board unit 100 and the moving board unit 200.

The guiding bracket 300 may be composed of one or more segments, and in one embodiment of the disclosure, the two segments may be configured to be capable of being separated and coupled. By this configuration, the guiding bracket 300 may be easily separated and coupled, and the moving board unit 200 and the fixed board unit 100 constrained by the guiding bracket 300 may easily be separated or disassembled. In other words, the phase shifter according to the embodiment has such configuration that is easy to be separated or disassembled, thereby facilitating repair and reassembly.

The holder 400 may serve as a medium for coupling the phase shifter according to the embodiment to external components. The holder 400 is fixed on one side to the fixed board unit 100, and is connected on the other side with fastening holes formed to other apparatuses external to the antenna. The phase shifter according to the embodiment and the external device may be directly connected through the fastening holes formed in the holder 400, or may be engaged by means of a coupling element such as a bolt, etc.

On the other hand, since the holder 400 has a locking bar that is adjacent to the moving board unit 200 and is locked to the moving board unit 200, the holder 400 may prevent the moving board unit from being dislocated. In this case, a position of the moving board unit 200 may be guided by both the guiding bracket 300 and the holder 400, allowing the moving board unit 200 to be precisely positioned.

Figure 2:
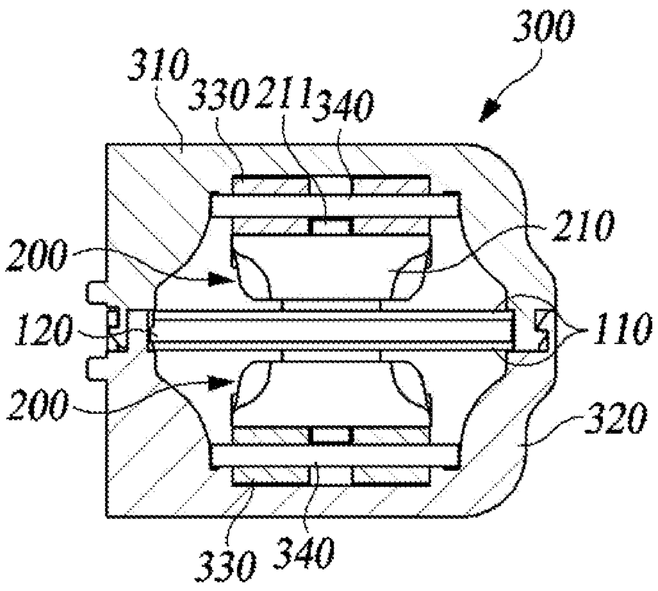
FIG. 2 is a cross-sectional view of a portion 'A-A' in FIG. 1.

FIG. 2 is a cross-sectional view of a portion ‘A-A’ in FIG. 1.

Figure 3:
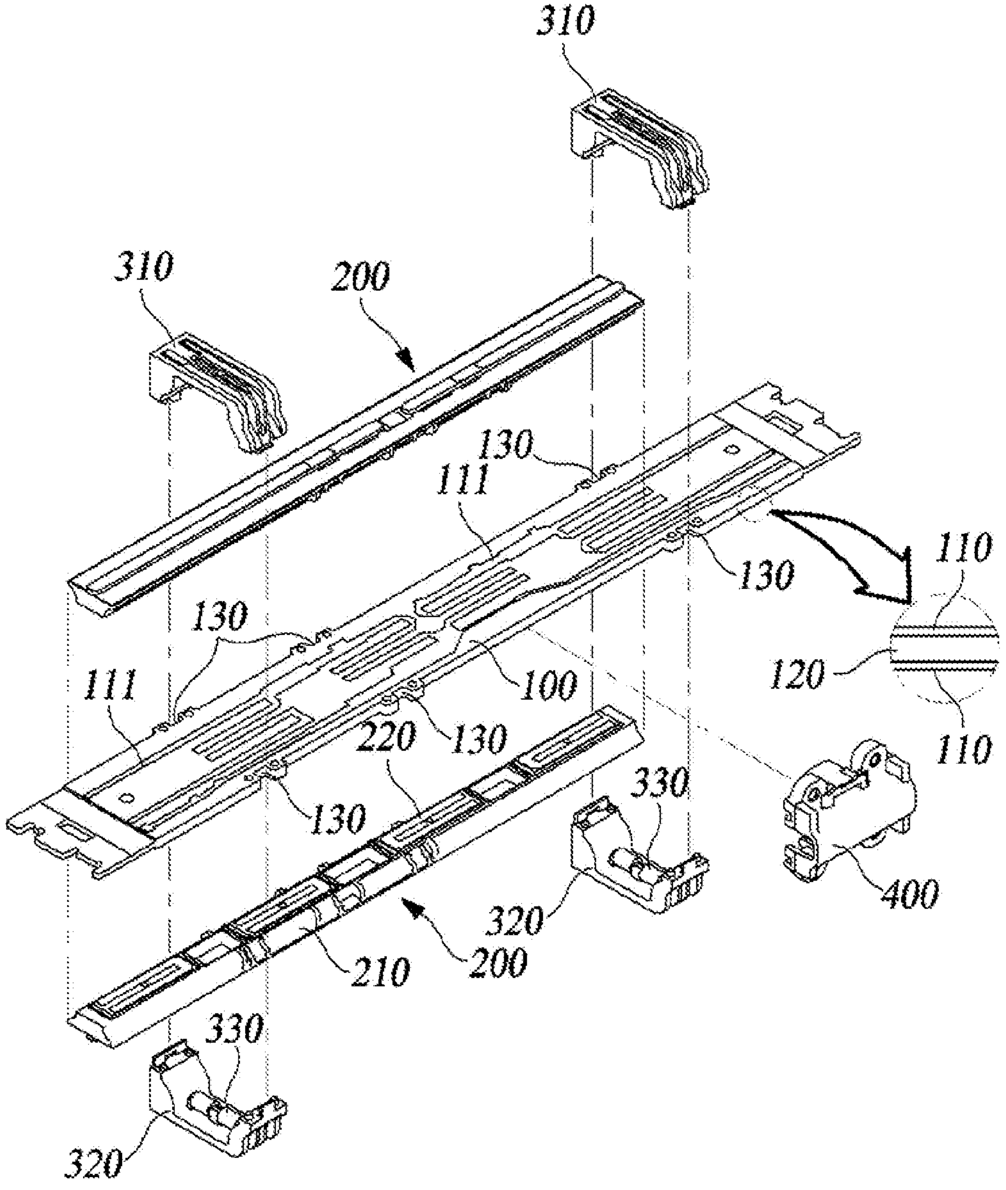
FIG. 3 is an exploded perspective view of the phase shifter in accordance with an embodiment of the disclosure.

FIG. 3 is an exploded perspective view of the phase shifter in accordance with an embodiment of the disclosure.

Now, elements of the phase shifter and combinational relationships in accordance with an embodiment of the disclosure is now described in detail with reference made to FIGS. 2 and 3.

The fixed board unit 100 (FIG. 3) may have an elongated plate-like structure fixedly coupled to at least one side inside the antenna. The fixed board unit 100 includes the circuit patterns 111 (FIG. 3) formed on at least one surface thereof. To be specific, the circuit patterns 111 (FIG. 3) are formed on a fixed circuit board 110 of the fixed board portion 100.

The circuit patterns 111 may be divided into a portion that is in contact with and coupled to strips 221 (FIGS. 4B and 5) formed on the mobile circuit board 220 (FIG. 3) of the mobile board portion 200 and a portion that is not in contact with the strips 221. Ports connected to separate cables are formed at ends of each of circuit patterns 111, so that the antenna signals may be input or output.

Meanwhile, in one embodiment of the disclosure, the fixed board unit 100 may include a base board 120 and fixed circuit boards 110 formed on both surfaces thereof, wherein circuit patterns 111 may be formed on each of the surfaces of two fixed circuit boards 110.

In this case, the base board 120 may be made from a material having a high dielectric constant. This is to prevent an electric field generated from the fixed circuit boards 110 formed on one side of the base board 120 from affecting current signals flowing through the fixed boards 110 formed on the other side of the base board 120.

The current signals flow through the circuit patterns 111 of the fixed circuit boards 110, and an induced electric field may be formed due to the flow of the current signals. In the phase shifter according to an embodiment of the disclosure, the current signals may flow not only on one surface of the fixed board unit 100 but also on the other side thereof. In such structure, there is a concern that the current signals flowing through the circuit patterns 111 formed on the other surface of the fixed board unit 100 are disturbed due to the induced electric field generated by the current signals flowing through the circuit patterns 111 formed in one surface of the fixed board portion 100.

The embodiment may prevent an electric field generated from the fixed circuit board 110 disposed on one side of the base board 120 from affecting the signal flow on the fixed circuit board 110 located on the other side, by disposing the base board 120 having a high dielectric constant between the fixed circuit boards 110 on both sides.

In one embodiment of the disclosure, the base board 120 may be made from Teflon® material. Although the dielectric constant of the Teflon® varies depending on the measurement conditions, the base board 120 has a dielectric constant of approximately 2 or more, so as to effectively prevent the electric field generated from the fixed circuit board 110 disposed on one side of the base board 120 from affecting the fixed board 110 disposed on the other side of the base board 120.

In addition, if the base board 120 is made from Teflon® material, the base board 120 may maintain the physical properties in a wide range of temperature, and has excellent heat-resisting property, which also prevents thermal damage to the fixing circuit board 110.

On the other hand, side grooves 130 (FIG. 3) may be formed at edges of the fixed board unit 100. The guiding bracket 300 (FIG. 2) may be fixed to the side grooves 130 of the fixed board unit 100. Specifically, each of end portions of a first segment 310 or a second segment 320 constituting the guiding bracket 300 may be fastened.

Widths of the side grooves 130 may be equal to or slightly larger than widths of each of the end portions of the first segment 310 or the second segment 320 of the guiding bracket 300. The side grooves 130 of the fixing circuit board 110 restrict a movement of the guiding bracket 300 in the longitudinal direction with respect to the fixed circuit board 110.

The moving board unit 200 is disposed between the guiding bracket 300 and one surface of the fixed board unit 100.

The moving board unit 200 may include a moving housing 210, and a moving circuit board 220 (FIG. 3) disposed within the moving housing 210. On the other hand, Although the embodiment describes a configuration in which the moving housing 210 and the moving circuit board 220 are separated from each other as one example, alternatively, the moving board unit 200 may has a configuration where the moving housing 210 and moving circuit board 220 are integrally formed. The moving housing 210 may be disposed on one surface and the other surface of the fixed board unit 100.

The moving circuit board 220 may be disposed in a space defined in the moving housing 210.

The moving circuit board 220 may be on one surface thereof in contact with and coupled to circuit patterns 111 formed on the fixed circuit board 110.

The contact state between the moving circuit board 220 and the fixed circuit board 110 changes as the moving board 220 slides on the fixed board portion 100 in conjunction with the sliding of the moving housing 210 along the longitudinal direction of the fixed board unit 100. The length and shape of the transmission path of the antenna signals changes according to such change in the contact state.

The guiding brackets 300 are disposed on outer sides of the moving board unit 200.

In one example, the guiding bracket 300 may be composed of the first segment 310 and the second segment 320. The guiding bracket 300 may also include one or more rollers 330 and shafts 340 (FIG. 2) connected to the first segment 310 and the second segment 320, respectively.

The first segment may be disposed in one side region of the fixed board unit 100.

The first segment 310 is coupled and fixed to the second segment 320 at end portions thereof, and one or both of end portions of the first segment 310 are disposed and fixed in the side grooves 130 formed in the fixed board unit 100, thereby preventing dislocation in the longitudinal direction of the fixed board unit 100. In this case, the widths of the end portions of the first segment 310 are snapped into the side grooves 130 such that the guiding bracket 300 may be prevented from being deviated.

The first segment 310 is engaged with the second segment 320 to prevent elevational dislocation, and is fixedly disposed in the side grooves 130 of the fixed board unit 100, thereby being prevented from longitudinal dislocation. Thus, the shafts 340 coupled to the first segment 310 and the rollers 330 coupled to the first segment 310 are prevented from being dislocated. In addition, since the first segment 310 is in a fixed position, the moving board unit 200 disposed between the first segment 310 and the fixed board portion 100 is also prevented from being dislocated.

The second segment 320 may be disposed in the other side region of the fixed board unit 100.

The second segment 320 is coupled and fixed to the first segment 310 at end portions thereof, and one or both of end portions of the second segment 320 are disposed and fixed in the side grooves 130 formed in the fixed board unit 100, thereby preventing dislocation in the longitudinal direction of the fixed board unit 100. In this case, the widths of the end portions of the second segment 320 are snapped into the side grooves 130 such that the guiding bracket 300 may be prevented from being deviated.

Further, the second segment 320 is engaged with the first segment 310 to prevent elevational dislocation, and is fixedly disposed in the side grooves 130 of the fixed board unit 100, thereby being prevented from longitudinal dislocation. This also prevents the shafts 340 and the rollers 330 coupled to the second segment 320 from being dislocated. In addition, since the second segment 320 is in a fixed position, the moving board unit 200 disposed between the second segment 320 and the fixed board portion 100 is also prevented from being dislocated.

The rollers 330 may be connected to a shaft 340 coupled to the inner surfaces of the first segment 310 and the second segment 320.

There could be a plurality of rollers 330 disposed. The plurality of rollers 330 may be spaced from one another. The distance between the plurality of rollers 330 may be equal to or slightly greater than a crosswise width of a guiding rib 211 of the moving housing 210. In this case, the guiding rib 211 (FIG. 2) is disposed in a space defined between the plurality of rollers 330, so that the guiding rib 211 may be prevented from being dislocated crosswise. Accordingly, the plurality of rollers 330 may guide the moving board unit 200.

One surface of the rollers 330 may be in contact with a portion of the one surface of a moving board unit 200 on which the guiding rib 211 is not formed. Specifically, one surface of the rollers 330 may be in contact with a surface of the moving housing 210 adjacent to the guiding rib 211. The roller 330 may rotate about the shaft 340 while maintaining contact with one surface of the moving housing 210 when the moving board unit 200 slides along the longitudinal direction of the fixed board unit 100.

Since the roller 330 maintains contact with the moving housing 210 of the moving board unit 200 when the moving board unit 200 slides, prevention of elevational vibrations of the moving board unit 200 to allow the moved board portion 200 to slide smoothly is possible. Also, the moving circuit board 220 hereby is prevented from elevational vibrations, so that the contact between the strip 221 formed on the moving circuit board 220 and the circuit pattern 111 formed on the fixed circuit board 110 may be stably maintained.

The shaft 340 is coupled to the inner surface of the guiding bracket 300. For example, the shaft 340 may be rotatably coupled to the inner surface of the guiding bracket 300. If the shaft 340 is rotatably coupled to the inner surface of the guiding bracket 300, the roller 330 may be fixedly coupled to the shaft 340. In this case, as the shaft 340 rotates, the roller 330 may also rotate.

On the other hand, the shaft 340 may be fixedly coupled to the inner surface of the guiding bracket 300. Herein, the roller 330 is not fixedly coupled to the shaft 340, but rather may be arranged so as to be rotatable on the shaft 340. In this case, when the moving board unit 200 moves, the shaft 340 does not rotate, and only the roller 330 rotates independently.

Figure 4A:
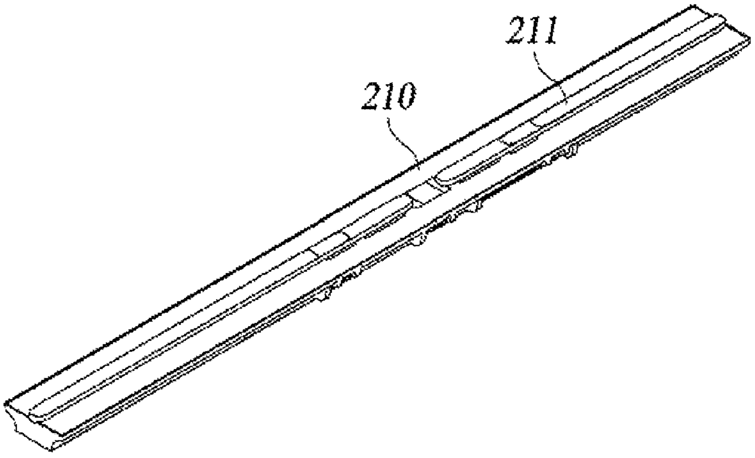
FIG. 4A is a perspective view showing a construction of a moving board unit of the phase shifter in accordance with an embodiment of the disclosure.

FIG. 4A is a perspective view showing a construction of a moving board unit of the phase shifter in accordance with an embodiment of the disclosure.

Figure 4B:
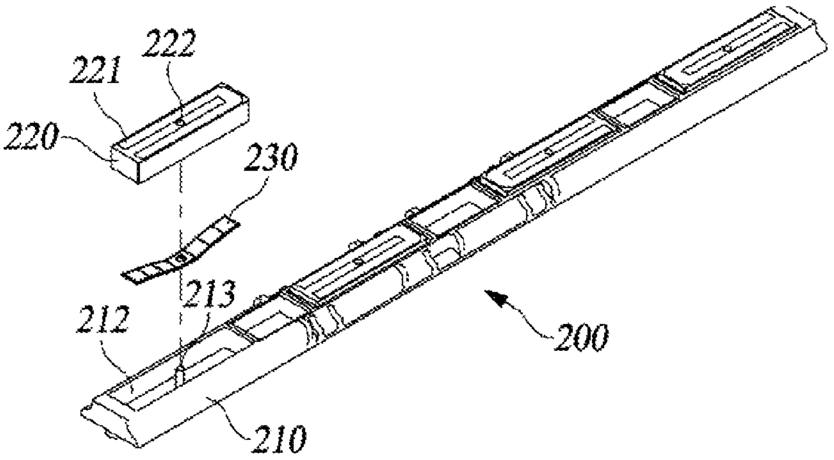
FIG. 4B is a perspective bottom view showing elements of the moving board unit of the phase shifter and combinatorial relationships in accordance with an embodiment of the disclosure.

FIG. 4B is a perspective bottom view showing elements of the moving board unit of the phase shifter and combinational relationships in accordance with an embodiment of the disclosure.

Now, individual elements of the moving board unit 200 (FIGS. 1-3) of the phase shifter and combinational relationships in accordance with an embodiment of the disclosure is now described with reference made to FIGS. 4A and 4B.

As previously described, the moving board unit 200 includes the moving housing 210 and the moving circuit board 220 as shown in FIG. 3. The moving board unit 200 may also include a leaf spring 230 (FIG. 4B) between the moving housing 210 and the moving circuit board 220.

The moving housing 210 may include a guiding rib 211 (FIG. 4A) and moving board placements 212 (FIG. 4B).

The guiding rib 211 may be formed on the outer surface of the moving housing 210. In one embodiment of the disclosure, the guiding rib 211 protrudes from one surface of the moving housing 210, and may be in a form extending in the longitudinal direction of the moving housing 210.

The guiding rib 211 may be prevented from being dislocated by the guiding bracket 300 disposed adjacent to the outer sides of the moving housing 210. The guiding rib 211 is prevented from being dislocated by the guiding bracket 300, thereby preventing dislocation of the moving housing 210. Specifically, as previously described, the roller 330 of the guiding bracket 300 prevents the guiding rib 211 and the moving housing 210 from being dislocated.

Furthermore, the guiding rib 211 is guided by the guiding bracket 300 during sliding of the moving housing 210. The moving housing 210 hereby slides along the longitudinal direction of the fixed board unit 100 while being guided by the guiding bracket 300. The presence of the guiding rib 211 prevents crosswise deviation of the moving circuit board 220 arranged inside the moving housing 210 with respect to the fixed board unit 100, enabling a stable contact between the moving and fixed circuit boards 220, 110.

On the other hand, a portion of an upper surface of the moving board unit 200 where the guiding rib 211 is not formed may be formed as a flat surface in one embodiment of disclosure. This flat surface may contact one surface of the roller 330. This configuration enables stable contact of the strip 221 with the circuit pattern 111 by preventing the elevational vibrations of the moving housing 210 and the moving circuit board 220 during sliding of the moving board unit 200, as previously described.

The moving board placement 212 is a space in which the moving circuit board 220 may be located. The moving board placement 212 is configured such that the space is defined between the moving housing 210 and the fixed board unit 100 in which the moving circuit board 220 may be located. The crosswise and lengthwise widths of the moving board arrangement 212 may be similar to or slightly larger than crosswise and lengthwise widths of the moving circuit board 220.

As the moving circuit board 220 is placed in the moving board placement 212, the moving circuit board 220 also slides on the fixed board unit 100 in conjunction with the sliding of the moving housing 210, and the position of the moving circuit board 220 changes correspondingly.

An elastic leaf spring 230 may be disposed in a space defined between one surface of the moving board placement 212 and the moving circuit board 220. The leaf spring 230 continuously presses the moving circuit board 220 toward the fixed board portion 100, and hence the moving board 220 and the fixed board unit 100 may be kept in contact with each other stably.

On the other hand, a protruding pin 213 may be formed in the moving board placement 212, which extends from the inner surface of the moving board arrangement portion 212, in order to prevent lateral deviation of the moving circuit board 220 as shown in FIG. 4B.

In this case, a coupling hole 222 may be formed in the moving circuit board 220 for insertion of the protruding pin 213 of the moving board placement 212, wherein the protruding pin 213 is inserted into the coupling hole 222 and fixes the moving circuit board 220, whereby may prevent the lateral deviation and dislocation of the moving board 220. On the other hand, a through hole through which the protruding pin 213 passes is formed in the leaf spring 230 is desirable. On the other hand, for insertion of the protruding pin 213, a coupling hole rather than the coupling hole 222 (FIG. 4B) may be formed in the moving circuit board 220.

The moving circuit board 220 may be disposed in the moving board placement 212 of the moving housing 210. The moving circuit board 220 includes a strip 221 disposed on a surface in contact with the fixed circuit board 110. Again, the coupling hole 222 may be formed in the moving circuit board 220.

The strip 221 formed on the moving circuit board 220 may be in contact with and coupled to the circuit pattern 111 formed on the fixed circuit board 110.

The contact aspect between the strip 221 and the circuit pattern 111 changes as the moving circuit board 220 slides on one side surface of the fixed board portion 100 in conjunction with the sliding of the moving housing 210 along the longitudinal direction of the fixed board portion 100. The contact state of the strip 221 and the circuit pattern 111 changes according to the displacement and placement state of a moving circuit board 220, and the length and shape of the transmission path of the antenna signals change according to such change in the contact state.

The coupling hole 222 formed in the moving circuit board 220 is engaged with the protruding pin 213 formed on the moving housing 210 to fix the moving circuit board 220 to the moving housing 210, whereby may prevent deviation and dislocation of the moving circuit board 220.

Figure 5:
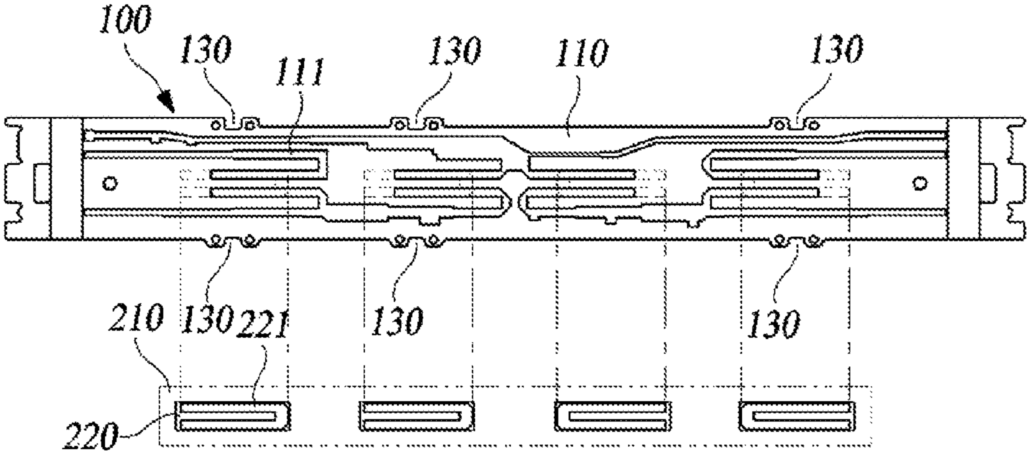
FIG. 5 is a top view of a fixed board unit and a bottom view of the moving board unit of the phase shifter in accordance with an embodiment of the disclosure.

FIG. 5 is a top view of the fixed board unit 100 and a bottom view of the moving board unit 200 (FIG. 4B) of the phase shifter in accordance with an embodiment of the disclosure.

Referring now to FIG. 5, a process of coupling the strip 221 of the moving circuit board 220 to the circuit pattern 111 on the fixed circuit board 110 of the phase shifter according to an embodiment of the disclosure will be described.

In FIG. 5, shown is a configuration in which the strip 221 formed on the moving circuit board 220 is in a form of U-shaped, and each strip 221 has symmetry with respect to a central portion on the moving board unit 200. However, that the shape and arrangement of the strips 221 may be configured differently as needed for design and modification of the circuit pattern 111 is evident.

Some of the circuit patterns 111 on the fixed circuit board 110 are in contact and coupled with strips 221 formed on a lower surface of the moving circuit board 220. The moving circuit board 220 is located in the moving board placement 212 (FIG. 4B) within the moving housing 210 and thus slides in the longitudinal direction of the fixed board portion 100 as the moving housing 210 moves.

As the moving circuit board 220 moves in the longitudinal direction of the fixed circuit board 110, the contact state of the circuit pattern 111 and the strip 221 changes, and the signal path length and shape may change depending on such change in the contact state. Accordingly, the antenna signals are phase-shifted depending on changes in signal path length and shape as the moving circuit board 220 moves.

Figure 6A:
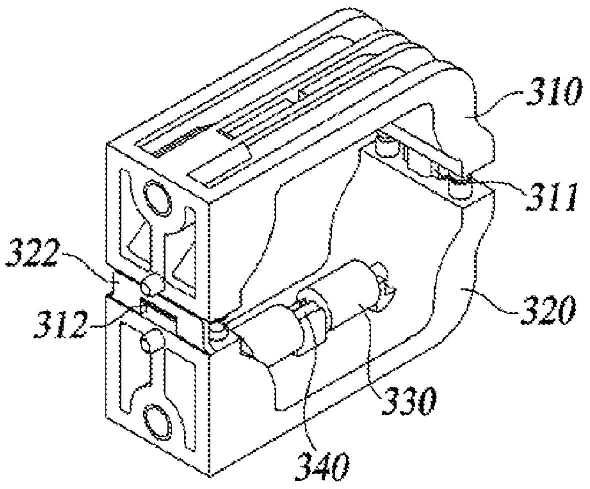
FIG. 6A is a perspective view showing a guiding bracket of the phase shifter with being coupled in accordance with an embodiment of the disclosure.

FIG. 6A is a perspective view showing a guiding bracket 300 of the phase shifter with being coupled in accordance with an embodiment of the disclosure.

Figure 6B:
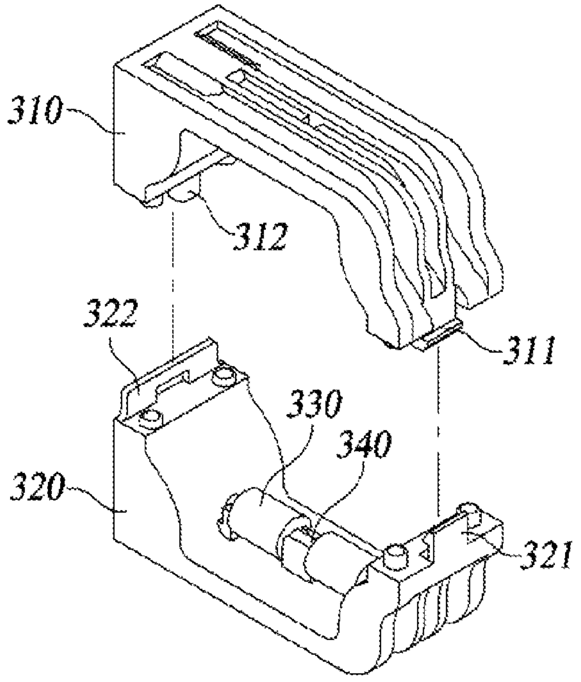
FIG. 6B is a perspective view showing the guiding bracket of the phase shifter with being separated in accordance with an embodiment of the disclosure.

FIG. 6B is a perspective view showing a guiding bracket 300 of the phase shifter with being separated in accordance with an embodiment of the disclosure.

Now, elements of the guiding bracket 300 of the phase shifter and combinational relationships in accordance with an embodiment of the disclosure is now described with reference made to FIGS. 6A-B.

The guiding bracket 300 may include a first segment 310 and a second segment 320.

A first coupling part 311 is formed at one end of the first segment 310, and a second coupling part 312 is formed at the other end of the first segment 310. A third coupling part 321 (FIG. 6B) is formed at one end of the second segment 320, and a fourth coupling part 322 is formed at the other end of the second segment 320. The first coupling part 311 is engaged with the third coupling part 321, and the second coupling part 312 is engaged with the fourth coupling part 322.

In one embodiment of the disclosure, the first coupling part 311 of the first segment 310 may be in a form that extends and projects from an end portion of one side of the first segment 310. The first coupling part 311 may be configured to have a locking bar projecting outward from the first segment 310 and to which the third coupling part 321 is engaged, at one end. Also, the first coupling part 311 may be tapered on one surface so that the third coupling part 321 is readily engaged.

On the other hand, the third coupling part 321 of the second segment 320 may be in a form that extends and projects from an end portion of one side of the second segment 320. The third coupling part 321 may be configured to have a locking bar projecting inward from the second segment 320 and to which the first coupling part 311 is engaged, at one end. Also, the third coupling part 321 may be tapered on one surface so that the first coupling part 311 is readily engaged.

The locking bar of the first coupling part 311 and the locking bar in the third coupling part 321 are engaged with each other to maintain the engagement between the first segment 310 and the second segment 320. The first coupling part 311 and the third coupling part 321 may be elastic members to easy to fasten.

In one embodiment of the disclosure, the second coupling part 312 of the first segment 310 may be in a form that extends from an end portion of the other side of the first segment 310, and projects outward of the first segment 310 at one end.

On the other hand, the fourth coupling part 322 of the second segment 320 may configured to extend from an end portion of the other side surface portion of the first segment 320, and to have a locking groove or a locking hole to which the second coupling part 312 of first segment 310 may be engaged at one end. The end portion of the second coupling part 312 may be configured to have a locking bar that may be engaged to the locking groove or the locking hole of the fourth coupling part 322. Also, the end portion of the second coupling part 312 may be tapered on one surface thereof so that the fourth coupling part 322 is readily engaged.

A width of the locking groove or the locking hole of the fourth coupling part 322 is formed to be similar to a width of the second coupling part 312, whereby the second coupling part 312 may be steadily fixed in the longitudinal direction of the fixed board unit 100. This locking groove or locking hole of the fourth coupling part 322 stops the second coupling part 312 from elevational movement as well as longitudinal movement with respect to the fixed board unit 100, enabling the guiding bracket 300 to be securely fastened.

In other words, in one embodiment of the disclosure, it is possible to securely and conveniently fasten the first segment 310 and the second segment 320 by first fastening the second coupling part 312 and the fourth coupling part 322, thereby preventing the first segment 310 and the second segment 320 from longitudinal movement with respect to the fixed board unit 100, and then fastening the first coupling part 311 and the third coupling part 321.

The foregoing describes the technical idea of the embodiment by way of illustration only, and thus various modifications and variations may be made by one of ordinary skill in the art to which the embodiment belongs without departing from the essential attributes of the embodiment. Therefore, the embodiments are intended to illustrate, and not to limit the technical idea of the embodiment, and the scope of the technical idea of the embodiment is not limited to these embodiments. It is intended that the scope of protection of the embodiment shall be interpreted as set forth in the following claims and to encompass all technical ideas falling within range of equivalents thereof.

What is claimed is:

1. A phase shifter, comprising:

an elongated fixed board unit including at least one fixed circuit board having a circuit pattern formed on one surface of the fixed board unit;

a guiding bracket surrounding the fixed board unit and fixed to the fixed board unit; and at least one moving board unit disposed between the guiding bracket and the one surface of the fixed board unit, wherein the at least one moving board unit is guided by the guiding bracket, wherein the at least one moving board unit includes at least one moving circuit board having conductive strips formed thereon, and wherein the conductive strips are coupled to the circuit pattern formed on the one surface of the fixed board unit, wherein the guiding bracket comprises at least one segment disposed on the fixed board unit, and wherein the guiding bracket completely surrounds a cross section of the fixed board unit and a cross section of the moving board unit.

2. The phase shifter of claim 1, wherein the at least one segment of the guiding bracket comprises a first segment disposed on the one surface of the fixed board unit and a second segment disposed on another surface of the fixed board unit and detachably engageable with the first segment.

3. The phase shifter of claim 2, wherein the first segment comprises a first coupling part formed at one end of the first segment and a second coupling part formed at another end of the first segment, the second segment comprises a third coupling part formed at one end of the second segment and a fourth coupling part formed at another end of the second segment, and the first coupling part and the second coupling part are detachably engageable with the third coupling part and the fourth coupling part, respectively.

4. The phase shifter of claim 1, wherein the at least one moving board unit comprises a moving housing comprising a guiding rib on one surface of the at least one moving board unit, the guiding rib extending along a longitudinal direction of the at least one moving board unit and guided by the guiding bracket, on the one surface of the at least one moving board unit.

5. The phase shifter of claim 4, wherein the guiding bracket comprises a plurality of rollers in contact with the at least one moving board unit.

6. The phase shifter of claim 5, wherein the guiding rib is located between the plurality of rollers and is guided by the plurality of rollers.

7. The phase shifter of claim 1, wherein the fixed board unit comprises side grooves formed at edges thereof, and the guiding bracket is configured to engaged with the side grooves so as to restrict movement of the guiding bracket in a longitudinal direction of the fixed board unit.

8. The phase shifter of claim 1, wherein the fixed board unit further comprises a base board, and the at least one fixed circuit board is disposed on both surfaces of the base board, and one of the at least one moving board unit is disposed in a space between the one surface of the fixed board unit and a first segment of the at least one segment and another of the at least one moving board unit is disposed in a space between the another surface of the fixed board unit and a second segment of the at least one segment.

9. The phase shifter of claim 8, wherein the base board is made from a material having a dielectric constant of 2.0 or more.

10. The phase shifter of claim 1, wherein a protruding pin is formed on an inner surface of the at least one moving board unit, and the protruding pin is inserted into a coupling hole formed in the at least one moving circuit board to fix the at least one moving board unit.

11. The phase shifter of claim 1, wherein a leaf spring is disposed between an inner surface of the at least one moving board unit and the at least one moving circuit board.

12. A communication device comprising the phase shifter according to claim 1.

* * * * *